(12) United States Patent
Suko et al.

(10) Patent No.: US 8,453,994 B2
(45) Date of Patent: Jun. 4, 2013

(54) ENGAGEMENT CHAIN TYPE DRIVING DEVICE

(75) Inventors: Tomoo Suko, Osaka (JP); Kohei Nakanishi, Osaka (JP); Tomoyuki Saji, Osaka (JP); Yoshifumi Takeuchi, Osaka (JP); Satoshi Ueda, Osaka (JP); Naoto Shibata, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 900 days.

(21) Appl. No.: 12/555,497

(22) Filed: Sep. 8, 2009

(65) Prior Publication Data

US 2010/0059727 A1    Mar. 11, 2010

(30) Foreign Application Priority Data

Sep. 9, 2008   (JP) ................................. 2008-230465

(51) Int. Cl.
   *B66D 1/20*   (2006.01)

(52) U.S. Cl.
   USPC ........ 254/358; 474/230; 474/231; 198/468.8; 198/850; 198/851; 198/853

(58) Field of Classification Search
   USPC .................. 254/358, 342, 362; 474/230, 212, 474/221, 231; 198/346.3, 468.6, 468.8, 850, 198/851, 853
   See application file for complete search history.

(56) References Cited

U.S. PATENT DOCUMENTS

| | | | |
|---|---|---|---|
| 2,212,907 A * | 8/1940 | Weiss ............................ | 474/231 |
| 7,819,389 B2 * | 10/2010 | Takeuchi et al. .............. | 254/358 |
| 7,921,986 B2 * | 4/2011 | Ando et al. ................. | 198/468.6 |

FOREIGN PATENT DOCUMENTS

JP        11-278797        10/1999

* cited by examiner

*Primary Examiner* — Emmanuel M Marcelo
(74) *Attorney, Agent, or Firm* — Maschoff Brennan (57) ABSTRACT

The invention relates to an engagement chain type driving device including a pair of driving sprockets, which rotate positively and reversely in opposite directions about a pair of rotating shafts, a pair of engagement chains, which engage with each other by the pair of driving sprockets so as to be integrated together, and a driving source, which drives the pair of driving sprockets, wherein the engagement chain includes inner tooth plates and outer tooth plates, which each include buckling limiting flat surfaces, the inner tooth plates and outer tooth plates being brought opposite to each other and into contact with each other when the engagement chains are integrated by the pair of driving sprockets, such that the flat surfaces hold the chain engagement position.

5 Claims, 12 Drawing Sheets

ENGAGEMENT CHAIN TYPE DRIVING DEVICE

CROSS-REFERENCE TO RELATED APPLICATIONS

The entire disclosure of Japanese Patent Application No. 2008-230465, filed Sep. 9, 2008 is expressly incorporated herein by reference.

BACKGROUND OF THE INVENTION

1. The Field of the Invention

The present invention relates to a driving device, which moves forward and backward in parallel with a setting surface for use in production facilities of various production fields, a transfer facility in a transportation field, a care facility in a medical welfare field, a stage facility in an art field and the like. More specifically, the present invention relates to an engagement chain type driving device, which uses an engagement chain as a driving medium for moving forward and backward.

2. The Relevant Technology

Figure 11:
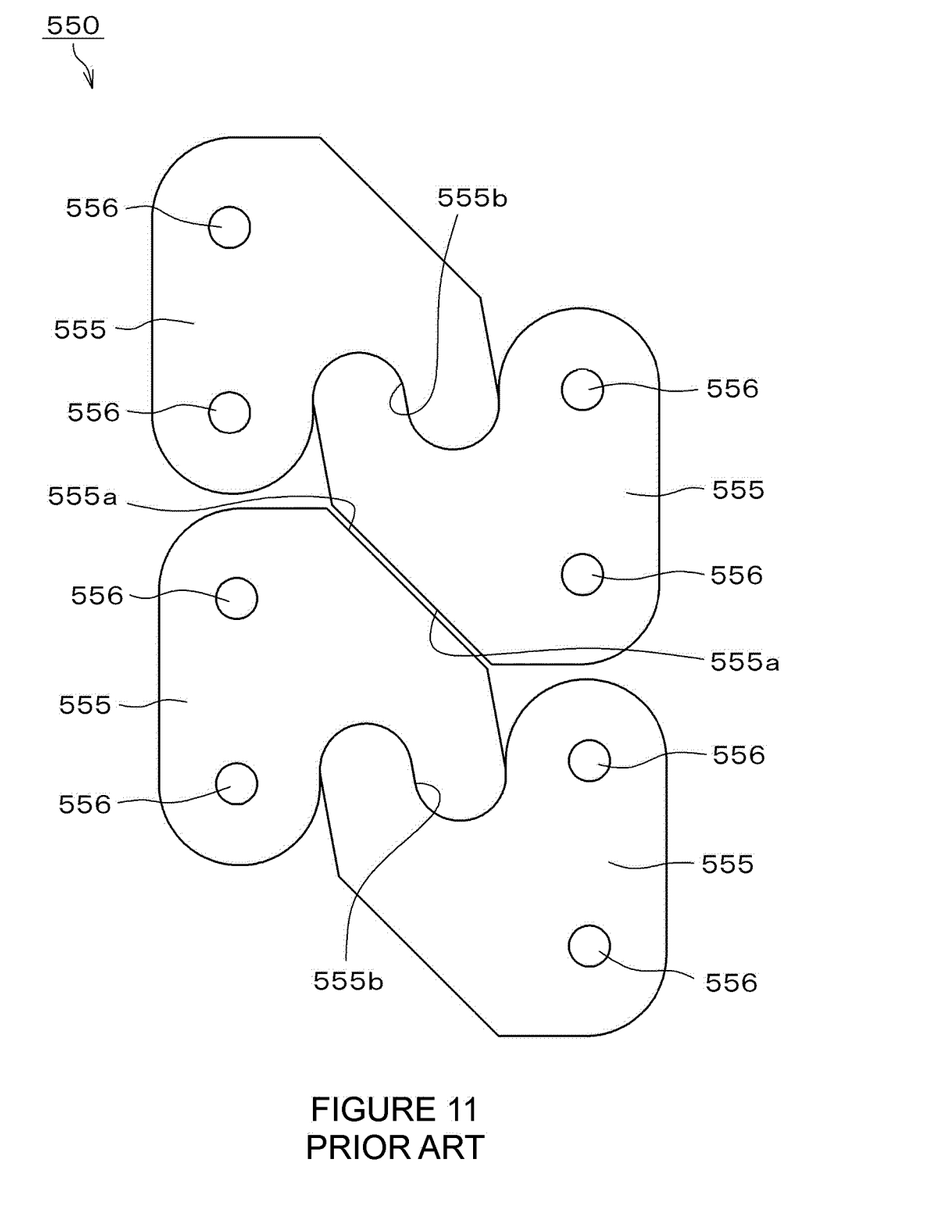
FIG. 11 is a plan view showing an engagement state of outer tooth plates forming engagement chains used in a conventional driving device currently known in the art.

One example of a driving device used for hoisting and lowering heavy articles is a so called chuck chain, which uses a pair of engagement chains, which are integrally hoisted and lowered while engaged with each other. FIG. 11 illustrates an example of an engagement chain 550 which is used as the conventional driving device. Various chains have been developed with hook surfaces 555b of a variety of shapes formed in respective link plates 555, different pitches between pins, a variety of pitches between bushes and the like. In one example, a buckling limiting flat surface 555a is formed at an opposite side region of the hook surface in a longitudinal direction of the plate, where the flat surface is used to hold the chain engagement position. As shown in FIG. 11, plate shapes are typically formed so that some space is produced between the buckling limiting flat surfaces 555a which face each other when a pair of engagement chains 550 are engaged with each other.

Figure 12:
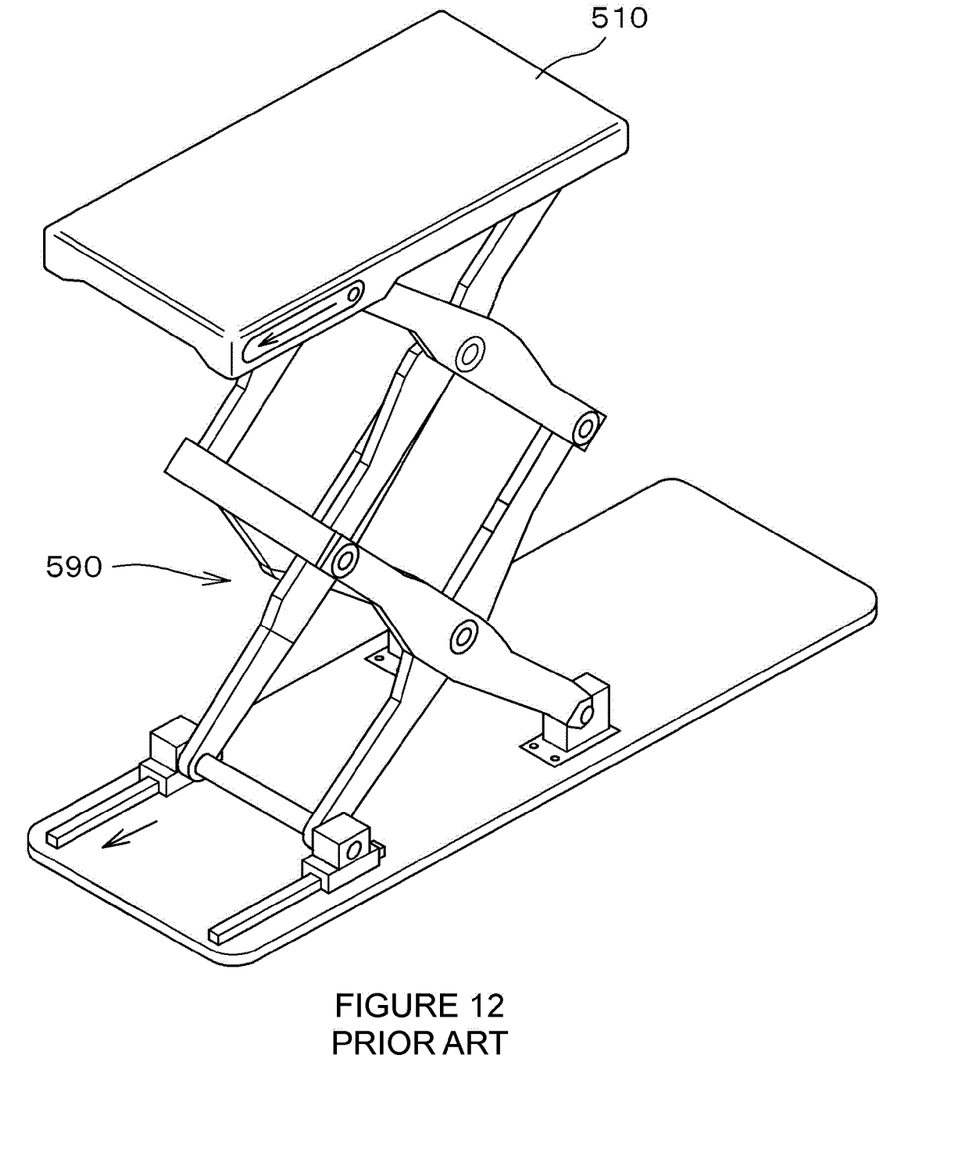
FIG. 12 is a perspective view showing an auxiliary guide means used in the conventional driving device currently known in the art.

However, in the conventional driving device a backlash is generated between link plates 555a due to spaces being generated between the bucking limiting flat surfaces 551, meaning that the rigidity of a pair of engagement chains 550 engaged with each other cannot be ensured. Therefore, it is necessary to provide an auxiliary guide means 590, which prevents buckling and inclination in the engagement chains 550 so as to guide a stable hoisting/lowering drive for a load supporting member 510. For example, an auxiliary means 590 composed of a pantograph mechanism is shown in FIG. 12 between the load supporting member 510 and a setting floor surface side. One problem with this structure, however, is that the entire device becomes complicated, and the flexibility of designing of the device is lost.

In addition, the reduction in the buckling strength in a pair of engagement chains 550 due to the space generated between the buckling limiting flat surfaces 555a makes it difficult to support large weights using a vertical wall surface or ceiling surface. Thus, various systems were developed where a load supporting member 510 using the pair of engagement chains 550 in a floor setting form, as described in the Japanese Patent Publication No. 3370928. As previously mentioned, however, when the engagement chain 550 is used in a driving device in a suspended form using a ceiling surface as a setting surface or a driving device in a cantilever supporting form using a vertical wall surface as a setting surface, problems with the reduced buckling strength in the engagement chains 550 has become significant.

The subject matter claimed herein is not limited to embodiments that solve any disadvantages or that operate only in environments such as those described above. Rather, this background is only provided to illustrate one exemplary technology area where some embodiments described herein may be practiced

BRIEF SUMMARY OF THE INVENTION

These and other limitations are overcome by embodiments of the invention which relate to a new design for an engagement chain, which has improved buckling strength and durability.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Accordingly, the present invention is to solve conventional problems that is the object of the present invention is to provide an engagement chain type riving device, in which stable driving forward and backward of works is realized without the necessity of setting an auxiliary guide means. This suppresses backing and inclination of the engagement chain so that miniaturization and weight lightening of the entire device can be achieved. This enables higher flexibility in designing other components and places where the device may be used and the like. The chain also facilitates easier maintenance and reduction of an operation load and a stable driving forward and backward of works is realized without the necessity of setting an auxiliary guide means when a suspended form. Thus, the engagement chain described herein is better suited for use with a ceiling setting surface and a cantilever supporting form in which a vertical wall surface is set as a setting surface.

One aspect of the invention is an engagement chain type driving device including a pair of driving sprockets, which rotate positively and reversely in opposite directions about a pair of rotating shafts, a pair of engagement chains, which engage with each other by the pair of driving sprockets so to be integrated together, and a driving source, which drives the pair of driving sprockets, wherein the engagement chain includes inner tooth plates and outer tooth plates, which each include buckling limiting flat surfaces, the inner tooth plates and outer tooth plates being brought opposite to each other and into contact with each other when the engagement chains are integrated by the pair of driving sprockets, such that the flat surfaces hold the chain engagement position.

Because the engagement chain type driving device of the present invention comprises a pair of driving sprockets, which rotate positively and reversely in opposite directions, the forward and backward movements supported by a front end of the engagement chain can be attained at an equal speed and rapidly in accordance with positive and reverse rotations of the driving sprockets.

In addition, the buckling limiting flat surfaces formed on the inner tooth plates and outer tooth plates forming the engagement chain, are brought into surface contact with each other when the inner tooth plates and the outer tooth plates are respectively opposed to each other. Thus, the backlash between the inner tooth plates and between the outer tooth plates and relative shifts between the inner tooth plates and between the outer tooth plates facing each other along the buckling limiting flat surfaces is reliably suppressed. Meanwhile, the rigidity of the pair of engagement chains engaged with reach other is ensured so that bucking strength is improved. Therefore, stable driving forward and backward of works can be realized without the necessity of setting an auxiliary guide means, wherein the engagement chains suppress buckling and inclination as in a conventional driving device.

Particularly, when an engagement chain type driving device of the present invention is used in a suspended setting form where a ceiling surface is used as a setting surface or in a cantilever supporting form where a vertical wall surface is used as a setting surface, the chain engagement positions of a pair of engagement chains engaged with each other can be reliably held in a straight line so that stable movements forward and backward of works can be realized without the necessity of setting an auxiliary guide means. This the engagement chain type driving device suppresses buckling and inclination of the engagement chain, and facilitates a larger variety of uses, unlike a conventional driving device.

Because there is no need for an auxiliary guide means as described above, miniaturization and weight lightening of the entire device can be realized and while reducing the complexity of the device so that high flexibilities of designing of the device are possible. For example, designing of other components forming an engagement chain type driving device and setting places of the entire device can be ensured.

Furthermore, since it is not necessary to set up and maintain the auxiliary guide means, it is easier to operate and maintain the driving device. And at the same time, a wider movable range of other components can be ensured so that a front end portion of the engagement chain located closer to the setting surface is more easily accessed. Thus, synchronization between associated installations arranged in front of and behind the engagement chain type driving device becomes easy and an operation load for carrying in and carrying out can be significantly reduced.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to an engagement chain type driving device, which is an example of the present invention, will be described with reference to drawings below.

An engagement chain type driving device 100, which is an example of the present invention, will be described with reference to drawings below.

Figure 1:
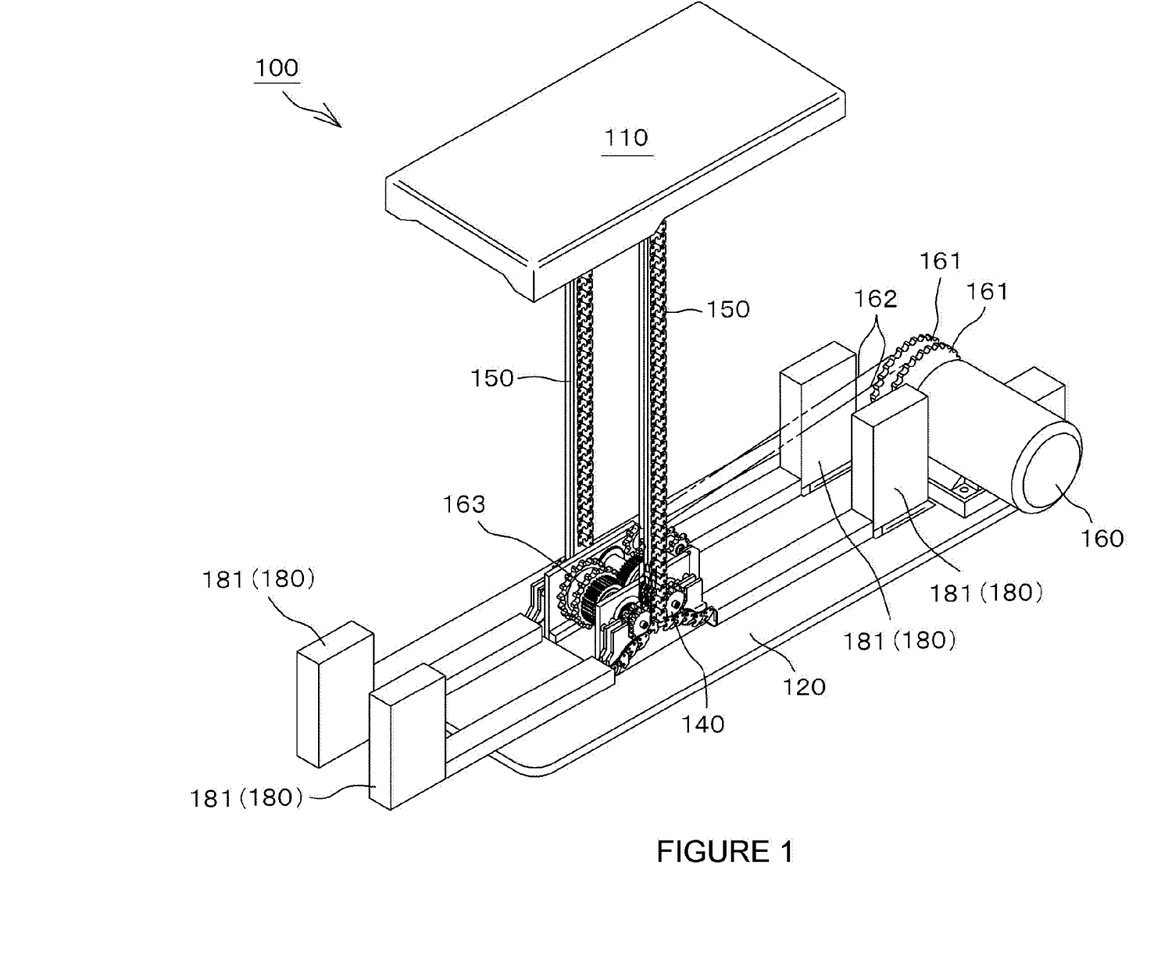
FIG. 1 is a perspective view of an engagement chain type driving device, which is an example of the present invention.

The engagement chain type driving device 100 shown in FIG. 1 is an example of the present invention. The device 100 is used for hoisting and lowering a hoisting/lowering table 110 which carries heavy articles (not shown) in parallel with a setting floor surface.

Figure 2:
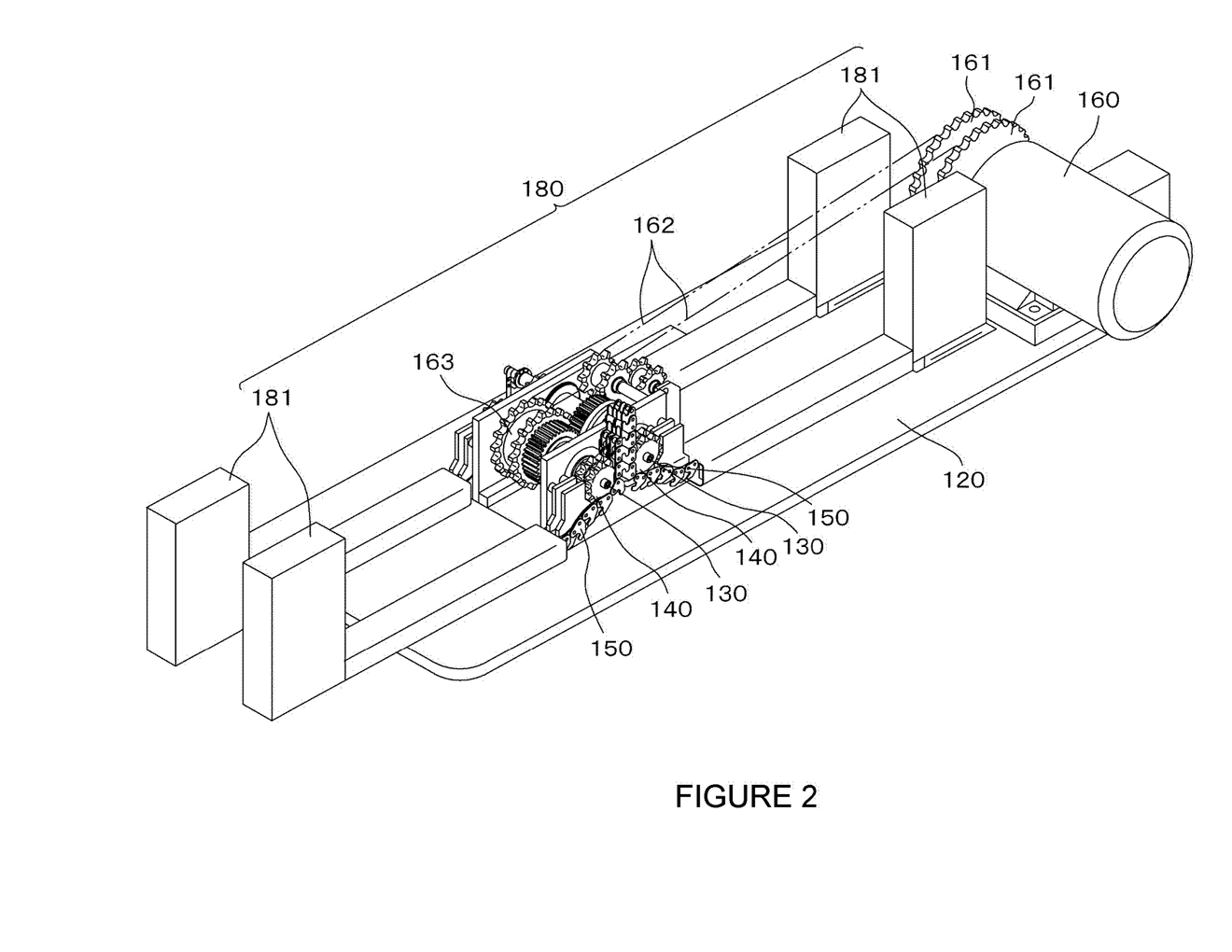
FIG. 2 is a perspective view of the device of FIG. 1, without the hoisting/lowering table and engagement chains of FIG. 1.

As shown in FIGS. 1 and 2, the engagement chain type driving device 100 of this example comprises a base plate installed on a setting floor surface on which the above-described hoisting/lowering table 110 is hoisted or lowered in parallel therewith. A pair of driving sprockets 140 positively and reversely rotate in opposite directions while facing each other on the same plane about a pair of rotating shafts 130 arranged in parallel with this base plate 120. A pair of engagement chains 150 hoist and lower the hoisting/lowering table 110 by disengaging the chains from the pair of driving sprockets 140.

The hoisting/lowering table 110 is arranged on the top of these engagement chains 150, which integrally hoist and lower the hoisting/lowering table 11. A power transmitting chain 160 transmits power to a synchronizing gear group 163, which rotates the above-described pair of driving sprockets 140. A driving motor is used as a driving source, which drives the power transmitting chains 162. Chain guide plates provided at a region where the pair of driving sprockets 140 face each other guide and move the pair of engagement chains 150.

The engagement chain type driving device 100 directly supports and presses up a work loaded hoisting/lowering table 110 with the pair of engagement chains 150 so that a torque of the driving motor 160 is efficiently transmitted.

The above-described pair of engagement chains 150 are arranged in two sets on the right and left sides with respect to the hoisting/lowering table 110. Thus, the table is protruded by two sets of chains. Thus, even when a load is loaded on only one side of the hoisting/lowering table 110, the pairs of engagement chains 150 respectively arranged on both right and left sides of the hoisting/lowering table 110 share the entire load and hoist and lowers in a self-standing state while sharing the load. This is unlike conventional systems where lateral vibration is liable to occur in a width direction in the hoisting/lowering table 110 near the position where the greatest load is placed on the hoisting/lowering table 110.

Further, the above-described power transmitting chains 162 are composed of two sets of roller chains for transmitting power from a motor side sprocket 161 to a driven side sprocket in a synchronizing gear group 163, in a so called two chains-wound fashion. Thus, the power transmitted from the motor side sprocket 161 to the driven side sprocket are divided to two parts so that the transmitting load is reduced. As such, even if one of the two-sets of arranged power transmitting chains 162 is cut, the other power transmitting chain 162 transmits power not so as to drop off the hoisting/lowering table 110.

Further, the above-described driving motor 160 includes a speed reducing mechanism composed of well-known worms and worm gears (not shown). Thus even if a driving fault occurs, mutual engagement resistance in a so called a self locking mechanism is operated between the worm and worm gear.

Figure 3:
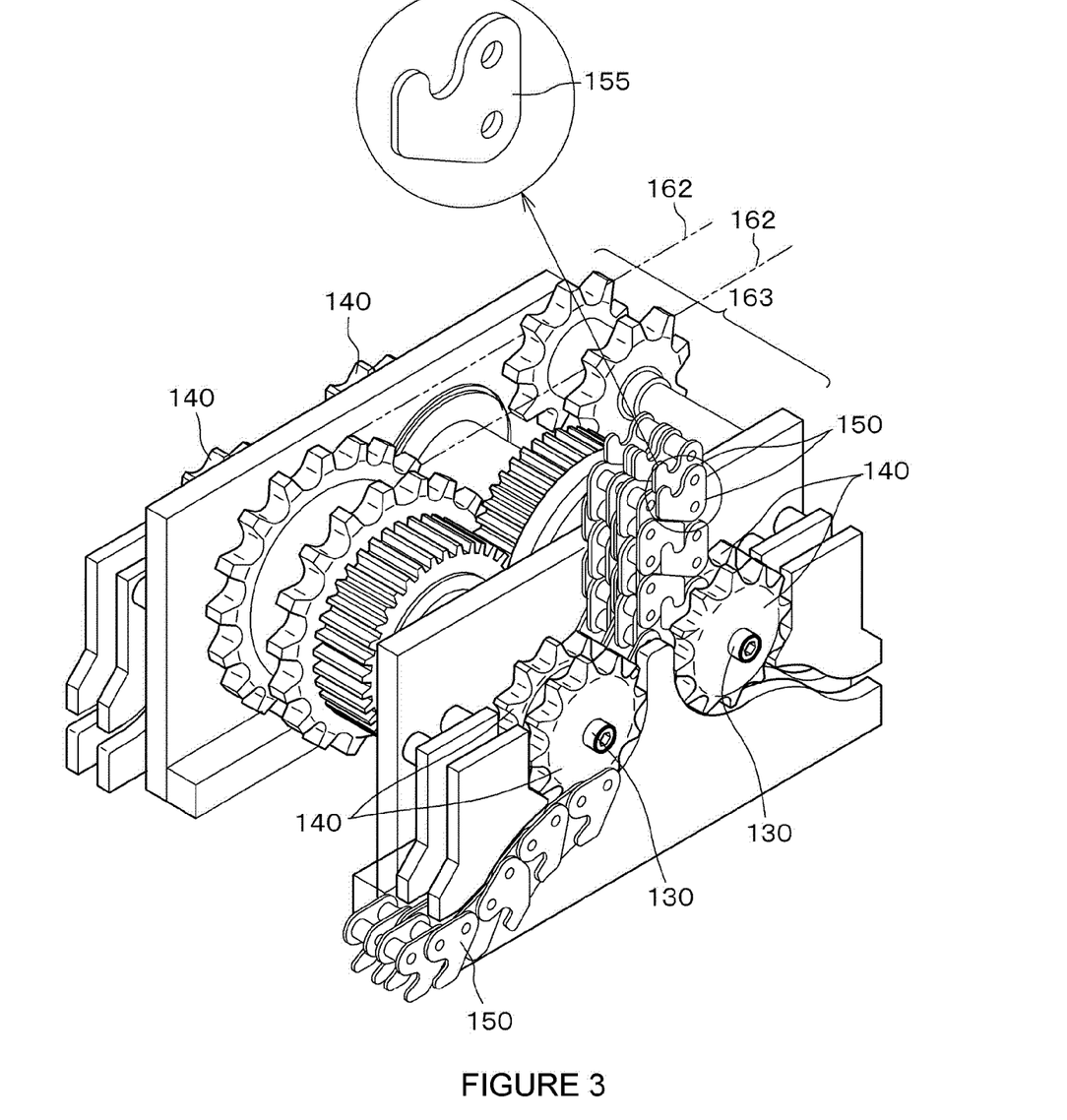
FIG. 3 is a partially enlarged view near the driving sprockets shown in FIG. 2.

It is noted that the reference numerals 161 shown in FIGS. 1 and 2 denote a pair of motor side sprockets 161 coaxially arranged on an output shaft side of the driving motor 160 including the speed reducing mechanism, and the reference numeral 163 shown in FIG. 3 denotes a synchronizing group for transmitting power so as to rotate positively and inversely in opposite directions from a pair of power transmitting chains 162 to a pair of driving sprockets 140.

In the engagement chain type driving device 100 of the present invention, chain guide plates 170, which guide and move a pair of engagement chains 150, are provided at a region where the pair of driving sprockets 140 face each other, and function so that the chain guide plates 170 engage a pair of engagement chains 150 with each other, so as to hoist them integrally in a self-standing state, while disengaging the pair of engagement chains 150 from each other.

Further, the driving motor 160 including the above-described speed reducing mechanism is disposed at a peripheral region of the lowest lowered position of the hoisting/lowering table 110 in a region other than the projected region of the hoisting/lowering table 110, as shown in FIG. 1 and the like.

Further, as shown in FIG. 1, chain accommodating means 180 are also disposed at peripheral regions of the lowest lowered position of the hoisting/lowering table 110 in regions other than the projected region of the hoisting/lowering table 110. Thus the pair of engagement chains 150 that are disengaged from each other and branched are accommodated in a chain accommodating means 180 composed of a winding type chain accommodating box 181 disposed at the driving motor 160 side. The other of the engagement chain 150 is accommodated in a chain accommodating means 180 composed of a winding type chain accommodating box 181 disposed at the opposite side facing the driving motor 160.

Because it is possible to lower the lowest position of the hoisting/lowering table 110 without considering the heights of the driving motor 160 and the chain accommodating means 180, the operation load of carrying works in and out of the hoisting/lowering table 110 is significantly reduced so that the driving motor 160 and the chain accommodating means 180 do not add difficulty during maintenance of the hoisting/lowering mechanism and a stable and simple maintenance operation can be performed.

Figure 4:
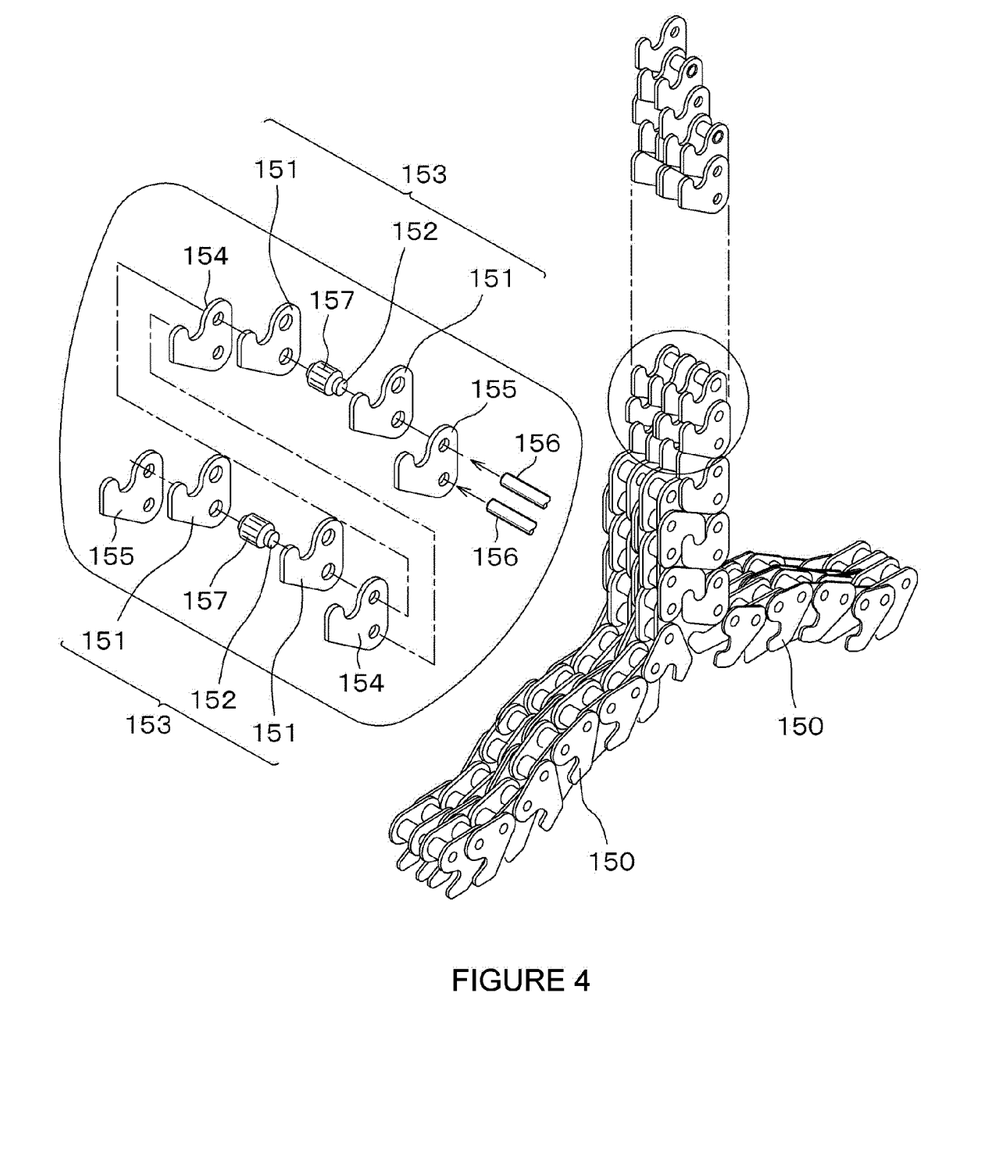
FIG. 4 is a perspective view showing an explosion and assembly state and disengagement state of engagement chains.
Figure 5:
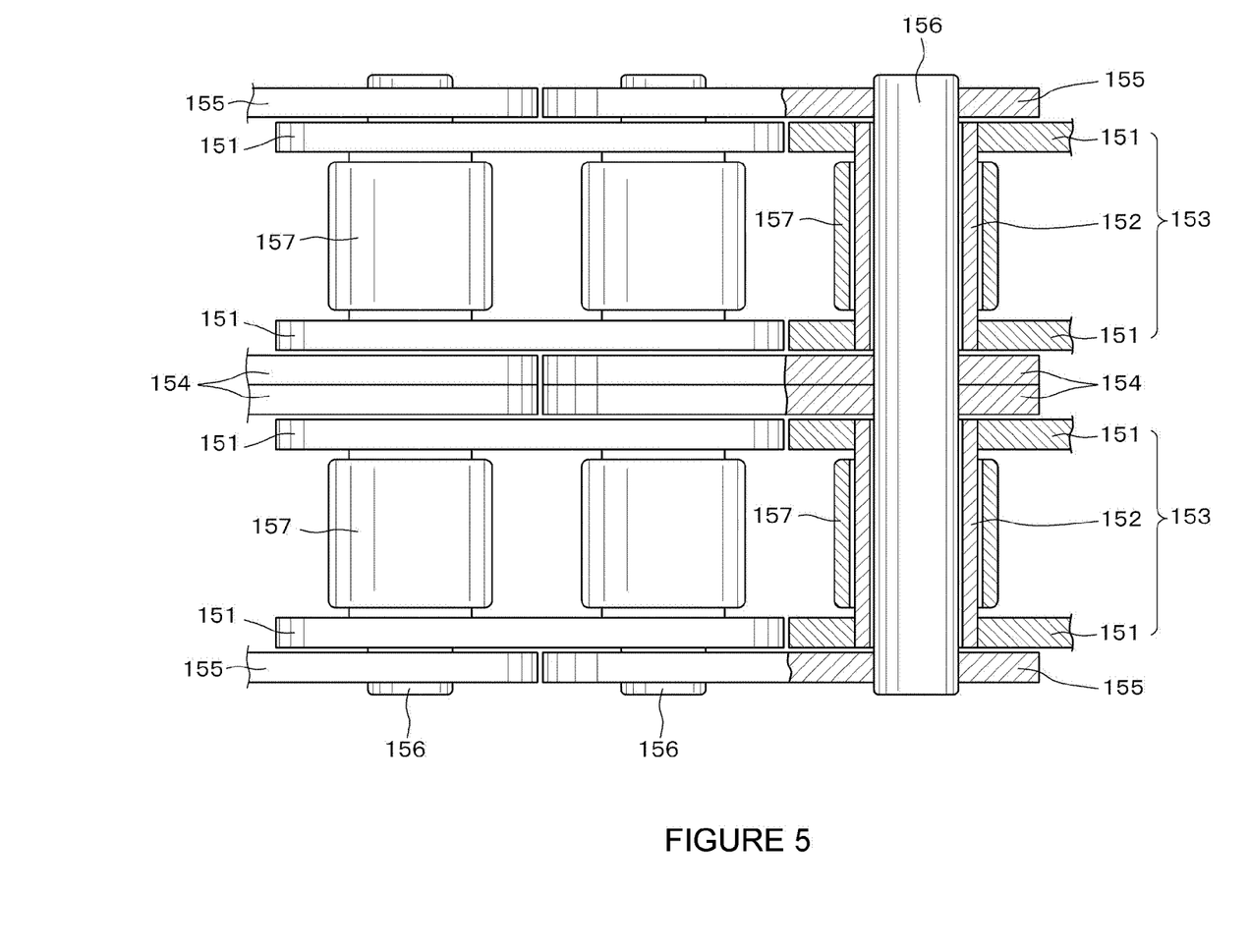
FIG. 5 is a partial cross-sectional view showing engagement chains.

The pair of engagement chains 150 used in the engagement chain type driving device 100, which is an example of the present invention, comprise a so called chuck chain. In the engagement chains 150, as shown in FIGS. 3 to 5, inner link units 153 each comprising a pair of right and left spaced inner tooth plates 151 and a pair of front and rear bushes 152 press-fitted into the inner tooth plates 151, are arranged in parallel with each other through two intermediate tooth plates 154 in the chain width direction. A number of inner link units 153 are connected to each other in the longitudinal direction of the chain by pairs of front and rear connecting pins 156 press-fitted into pairs of front and rear pin holes of outer tooth plates 155 disposed on the outermost sides in the chain width direction. Rollers 157 are fitted onto outer circumferences of the bushes 152.

In the engagement chain 150 used in the present invention, because the inner link units 153 are arranged in parallel with each other in the chain width direction, and an inner tooth plate 151, an intermediate tooth plate 154 and an outer tooth plate 155 of one engagement chain 150 engages with the inner tooth plate 151, intermediate tooth plate 154 and outer tooth plate 155 of an opposing engagement chain, it is possible to form a strong chain where buckling in the chain width direction is reliably suppressed. Furthermore, the engagement balance with driving sprockets 140 in the chain width direction can be improved.

Further, as shown in FIGS. 3 and 4, the pair of engagement chains 150 are each disposed opposite to the pair of driving sprockets 140, so that the inner tooth plates 151, outer tooth plates 155 and intermediate tooth plates 154 are engaged with each other so as to be integrally hoisted in a self-standing state while deflecting from the horizontal direction to the vertical direction. And in the pair of engagement chains 150, the inner tooth plates 151, the outer tooth plates 155 and the intermediate tooth plates 154 are disengaged from each other and branched while deflecting from the vertical direction to the horizontal direction by use of the above-mentioned pair of driving sprockets 140.

Next, the specific shape of the inner tooth plate 151, intermediate tooth plate 154 and outer tooth plate 155 of the engagement chain 150, will be described in more detail with reference to FIGS. 6-9.

Figure 6:
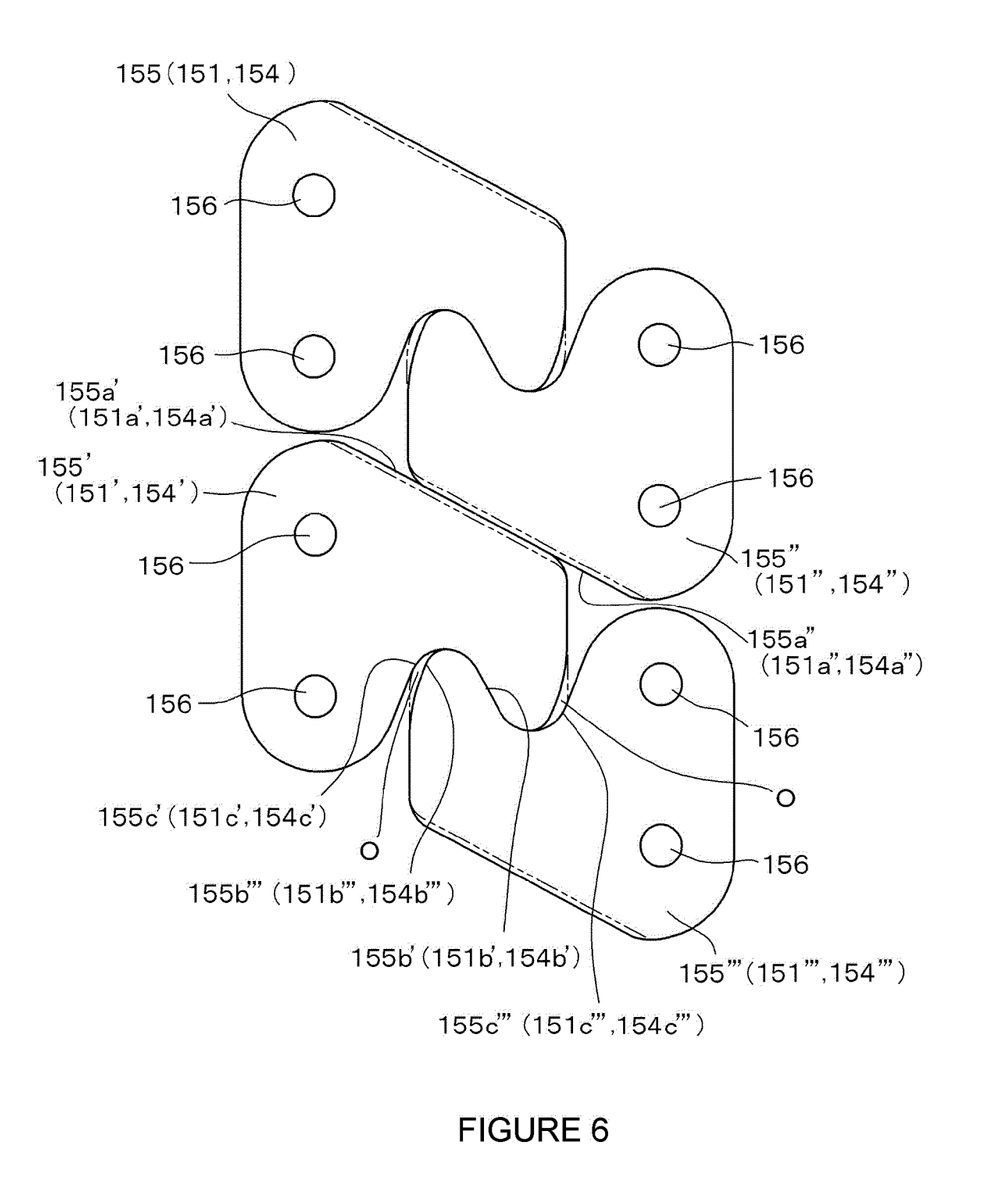
FIG. 6 is an explanatory view showing an engagement position between outer tooth plates.

The outer tooth plate 155 has a buckling limiting flat surface 155a extending from a plate proximal end portion toward the other outer tooth plate 155 side, a hook-shaped engagement surface 155b formed in an opposite side region of the buckling limiting flat surface 155a in the longitudinal direction of the plate and a curved engagement receiving surface 155c formed at a region between the hook-shaped engagement surface 155b and the plate proximal end portion. As shown in FIG. 6, when, in the above-described buckling limiting flat surface 155a, a pair of engagement chains 150 facing each other are engaged with each other, a buckling limiting flat surface 155a' formed on an outer tooth plate 155' is brought into surface contact with a buckling limiting flat surface 155a" formed on a preceding outer tooth plate 155" situated opposite to the outer tooth plate 155' so that a chain engagement position is held.

Further, as shown in FIG. 6, the buckling limiting flat surfaces 155a are bulgedly formed so that when the buckling limiting flat surface 155a' and the buckling limiting flat surface 155a" are bought into surface contact with each other, these buckling limiting flat surfaces 155a' and 155a" interfere with each other and elastically deform. It is noted that the dotted line shown in FIG. 6 denotes an outward form of a buckling limiting flat surface 555a formed on a link plate 555 of an engagement chain 550 used in a conventional driving device.

As shown in FIG. 6, the above-described hook-shaped engagement surface 155b and the curved engagement receiving surface 155c are designed so that when a pair of engagement chains 150 are engaged with each other, a hook-shaped engagement surface 155b' and a curved engagement receiving surface 155c' formed on the outer tooth plate 155' are engaged with a hook-shaped engagement surface 155b''' and a curved engagement receiving surface 155c''' formed on a preceding outer tooth plate 155''' opposite to the outer tooth plate 155b''' in a concave element and convex element engagement fashion to hold a chain engagement position.

In addition, as shown in FIG. 6, an engagement region of the hook-shaped engagement surface 155b is formed so that when the outer tooth plate 155' and the outer tooth plate 155''' engage with each other, the contact between the hook-shaped engagement surface 155b' formed on the outer tooth plate 155' and a plate proximal portion side region of the curved engagement receiving surface 155c''' formed on the outer tooth plate 155''' is avoided while also avoiding contact between the hook-shaped engagement surface 155b' formed on the outer tooth plate 155''' and a plate proximal portion side region of the curved engagement receiving surface 155c' formed on the outer tooth plate 155'. As a result interference avoiding spaces O are produced, so as to prevent the interference between the outer tooth plate 155' and the outer tooth plate 155''' from being generated at the time of starting engagement, so that a smooth and reliable engagement operation is realized.

The inner tooth plate 151 and the intermediate tooth plate 154 are formed as in the above-described outer tooth plate 155 and include buckling limiting flat surfaces 151a and 154a, hook-shaped engagement surfaces 151b and 154b and curved engagement receiving surfaces 151c and 154c, respectively.

Next, an operation of the outer tooth plate 155 during engagement of a pair of engagement chains 150 will be described with reference to FIGS. 7-9.

Figure 7:
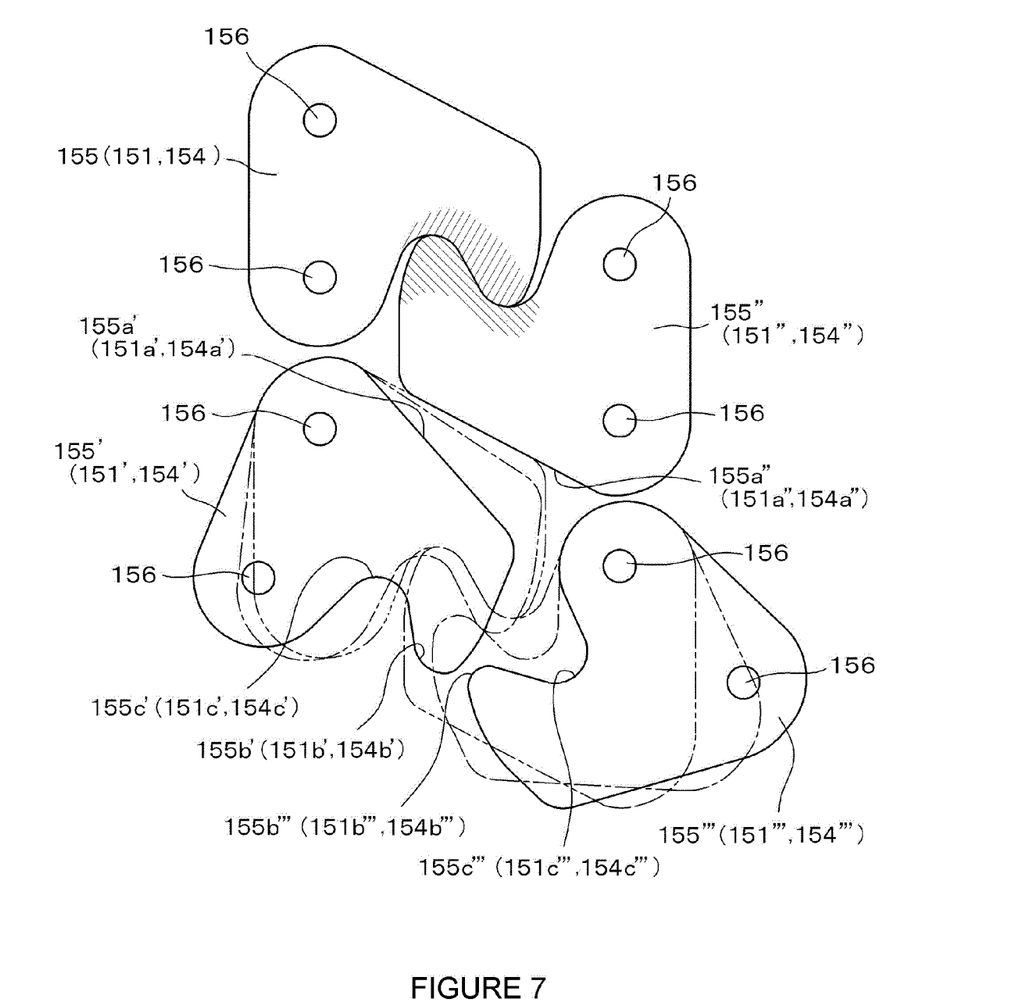
FIG. 7 is an explanatory view a state of starting of engagement between outer tooth plates.
Figure 8:
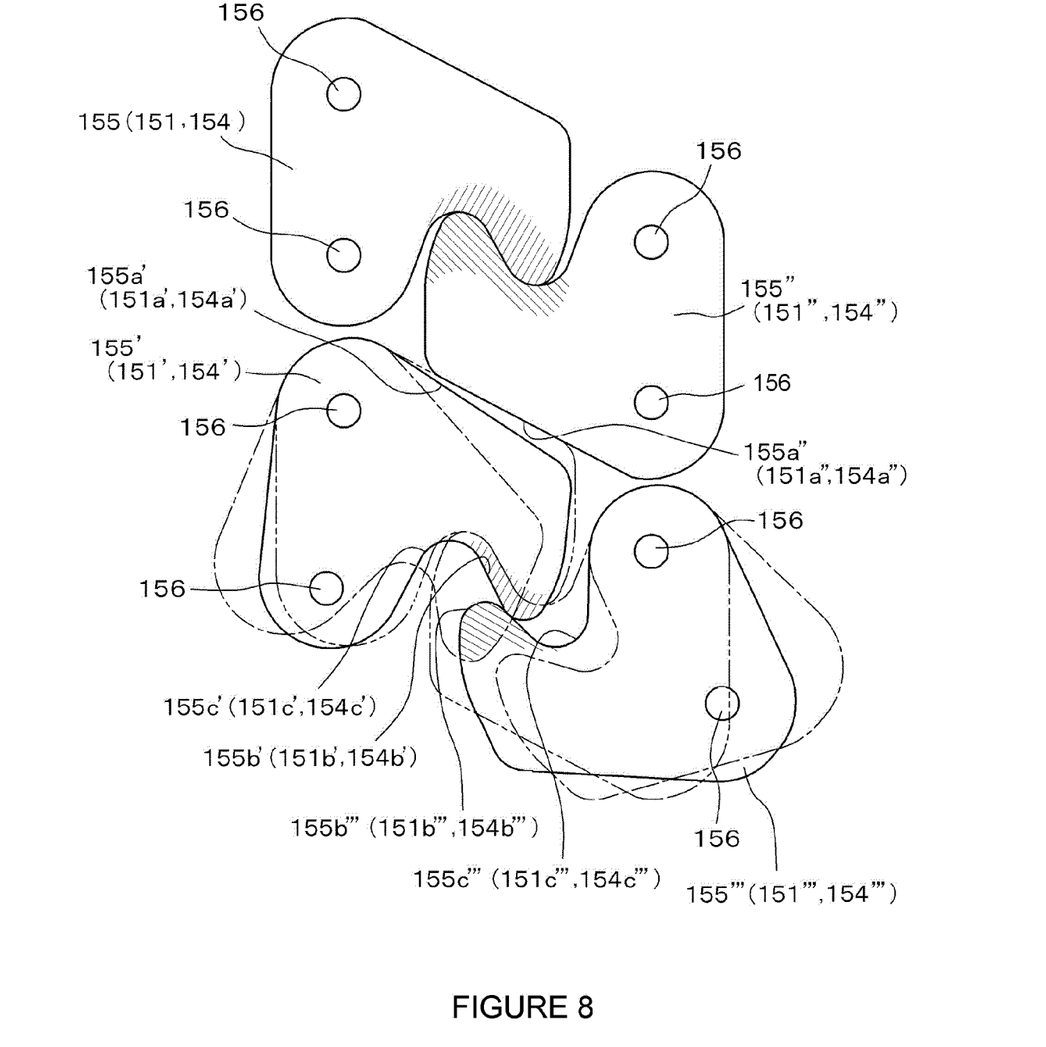
FIG. 8 is an explanatory view showing a state in the way of engagement between outer tooth plates.

First, as shown in FIG. 7, the outer tooth plate 155' and the outer tooth plate 155''' respectively rotate about connecting pins 156 which are press-fitted, so as to rotate forward in a chain advancing direction from disengagement states to their approaching direction. Then, as shown in FIG. 8, the outer tooth plate 155' and the outer tooth plate 155''' approach to each other while respectively coming into sliding contact between the hook-shaped engagement surfaces 155b' and 155b''' and the curved engagement receiving surfaces 155c' and 155c''', so as to engage with each other.

Figure 9:
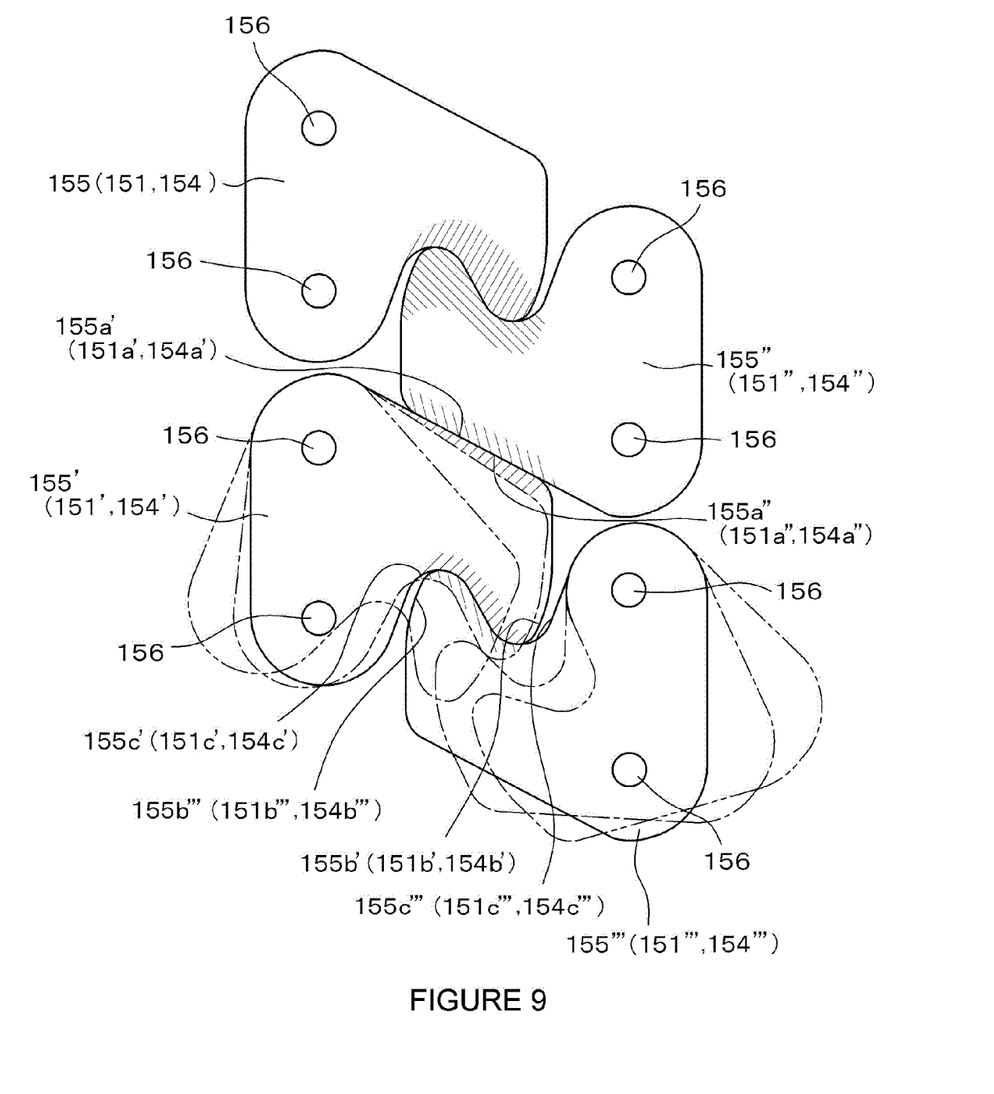
FIG. 9 is an explanatory view of a state of the completion of engagement between outer tooth plates.

As shown in FIG. 9, the outer tooth plate 155' is positioned by causing the buckling limiting flat surface 155a' to come into surface contact with the buckling limiting flat surface 155a'' formed on the outer tooth plate 155'', and the outer tooth plate 155' and the outer tooth plate 155''' are engaged with each other by respectively engaging their hook-shaped engagement surfaces 155b', 155b''' and the curved engagement receiving surfaces 155c', 155c''' in a concave element and convex element engagement fashion. The inner tooth plate 151 and the intermediate tooth plate 154 operate as in the above-described outer tooth plate 155.

Next, hoisting and lowering operations of the engagement chain type driving device 100, which is an example of the present invention, will be described with reference to FIG. 1.

First, as shown in FIG. 1, when hoisting/lowering table 110 reaches the highest hoisted position, a pair of engagement chains 150 are drawn out of chain accommodating means 180 each composed of a chain accommodating box 181 by a pair of driving sprockets 140, and are hoisted at the same speed and rapidly by two chains-wrapped power transmitting chain 162 in accordance with an output of a driving motor 160 including a speed reducing mechanism while supporting all weights of the load situated on the hoisting/lowering table 110.

Figure 10:
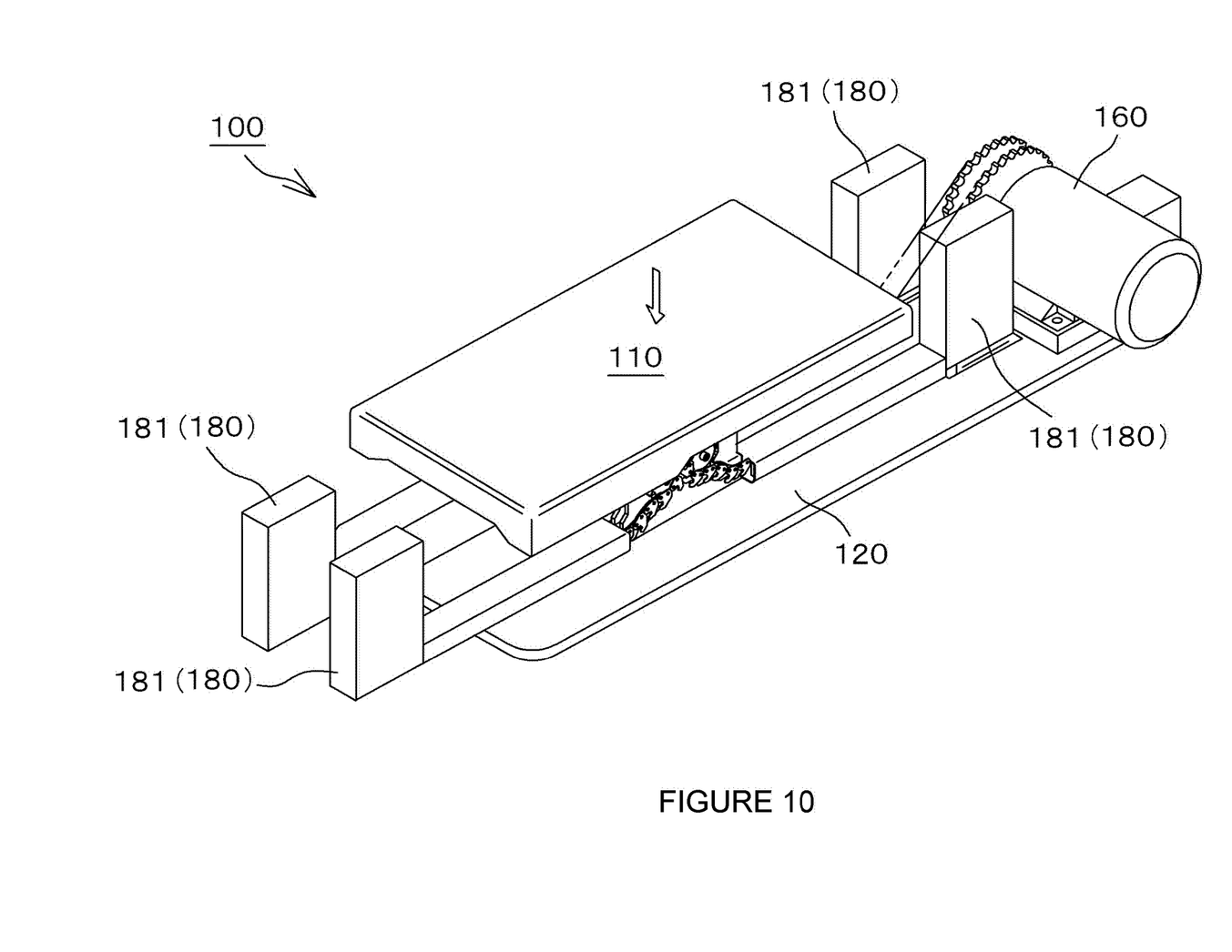
FIG. 10 is a perspective view showing a state of lowering at the lowest lowered position of a hoisting/lowering table.

On the other hand, as shown in FIG. 10, when the hoisting/lowering table 110 reaches the lowest position, a pair of engagement chains 150 are drawn in the chain accommodating means each composed of a chain accommodating box 181 by the pair of driving sprockets 140 while branching, and are lowered at the same speed and rapidly by two chains-wrapped power transmitting chain 162 in accordance with an output of the driving motor 160 including a speed reducing mechanism while supporting the load on the hoisting/lowering table 110.

In the thus obtained engagement chain type driving device 100 of the present example, the buckling limiting flat surfaces 151a, 154a, and 155a, which hold an engagement position, respectively formed in the inner tooth plates 151, the intermediate tooth plates 154 and the outer tooth plates 155, forming an engagement chain 150, come into surface contact with each other while inner tooth plates 151, intermediate tooth plates 154 and outer tooth plates 155 each engage with each other by driving sprockets 140 and are integrated into a integrated chain. Because the backlash between the inner tooth plates 151, the intermediate tooth plates 154 and the outer tooth plates 155 and relative displacements between inner tooth plates 151, intermediate tooth plates 154 and outer tooth plates 155 facing each other along the buckling limiting surfaces 151a, 154a and 155a are reliably suppressed, and rigidity of a pair of engagement chains 150 engaged with each other is ensured so that a buckling strength can be improved. Thus, a stable driving forward and backward process can be realized without setting an auxiliary guide means for suppressing bucking and inclination of the engagement chains 150, as is generally required in devices currently known in the art.

Thus, the chain engagement position of a pair of engagement chains 150 engaged with each other is linearly and reliably held without the necessity of setting auxiliary guide means, while suppressing the buckling and inclination of the engagement chains 150, even when the engagement chain type driving device 100 of the present invention is used in a suspended form or in a cantilever supporting form. As a result stable movement forward and backward of works can be realized.

Further, since, according to the engagement chain type driving device of the present example, the auxiliary guide means currently used in the art is not needed as described above, it is possible to reduce the size and weight of the entire device while simplifying the design of the device. This improves the variety of configurations in which the device may be used and permits a greater variety of other components forming the engagement chain type driving device 100.

Further, as described above, operation of the auxiliary guide is no longer necessary, operation of the device is simplified. And at the same time a wider movable range of other components can be used. In particular, as shown in FIG. 10, it is possible to access the hoisting/lowering table 110 closer to the setting floor surface. This means that it is possible to lower the table further, and that synchronization between associated installations (not shown) arranged in front of and behind the engagement chain type driving device 100 are simplified and an operation load for loading and unloading the hoisting/lowering table 110 can be significantly reduced.

Further, since in the engagement chain type driving device 100 of this example, the guide means 590 typically provided between a load supporting member 510 and a setting floor surface side is no longer required, supporting other weight of such a guide means 590 is not needed and works can be stably hoisted and lowered by a smaller hoisting and lowering thrust force. Thus, the allowable loading capacity of the engagement chain type driving device 100 can be improved.

Further, the bucking limiting flat surfaces 151a, 154a and 155a facing each other are bulgedly formed so that they are brought into surface contact with each other while interfering with each other to elastically deform. Therefore, the buckling limiting flat surfaces 151a, 154a and 155a facing each other are reliably brought into surface contact with each other without accurately molding the outer shapes of the inner tooth plate 151, the intermediate tooth plate 154 and outer tooth plate 155. Thus an operation load on molding the inner tooth plate 151, the intermediate tooth plate 154 and outer tooth plate 155 can be reduced.

Further, hook-shaped engagement surfaces 151b, 154b and 155b and curved engagement receiving surfaces 151c, 154c and 155c, are respectively formed on the inner tooth plates 151, the intermediate tooth plates 154 and the outer tooth plates 155. Therefore, the hook-shaped engagement surfaces 151b, 154b and 155b and the curved engagement receiving surface 151c, 154c and 155c are engaged with each other in a concave element and convex element engagement fashion when a pair of engagement chains 100 are engaged with each other. Thus the adjacent inner tooth plates 151, the adjacent intermediate tooth plates 154 and the adjacent outer tooth plates 155 are reliably engaged with each other so that a rigidity of a pair of engagement chains 150 can be ensured.

Engagement regions, which produce interference avoiding spaces O, are formed on the hook-shaped engagement surfaces 151b, 154b and 155b formed on the inner tooth plates 151, the intermediate tooth plates 154 and the outer tooth plates 154. Thus, interference between the hook-shaped engagement surfaces 151b, 154b and 155b and the curved engagement receiving surfaces 151c, 154c and 155c at the time of starting of engagement of a pair of engagement chains 150 is avoided. Thus, even if the inner tooth plates 151, the intermediate tooth plates 154 and the outer tooth plates 155 are formed so that the space between buckling limiting flat surfaces 151a, 154a and 155a is lost, smooth and reliable engagement operations of adjacent inner tooth plates 151, adjacent intermediate tooth plates 154 and adjacent outer tooth plates 155 can be ensured. Therefore the effects of the present invention are very large.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the above description includes a pair of engagement chains which are engaged and disengaged using a pair of driving sprockets, any concrete chain forms may be used. For example, chain forms having rollers, no rollers, that is having only bushes, or having a single row in the chain width direction, two or more rows in the chain width direction or their combination, may be adopted. However, since in a case two or more rows of the chains are adopted, an outer tooth plate and an inner tooth plate, forming one of a pair of engagement chains, strongly engage with an outer tooth plate and an inner tooth plate, forming the other engagement chain facing the former engagement chain in a hook shape and in a multiple fashion over the rows in the chain width direction, buckling liable to occur in a chain width direction of the engagement chain is reliably suppressed so that excellent chain endurance can be preferably realized.

Further, a bush integrally including a plate side press-fitted portion which is press-fitted into the inner tooth plate and a sprocket engagement portion having a larger diameter than the plate side press-fitted portion, may also be adopted. In this case where such a bush is adopted, since a driving sprocket stably comes into contact with a specified outer circumferential surface in a sprocket engagement portion integrally molded with a bush, the occurrence of engagement vibration or engagement noise due to an offset of a roller with respect to the center of a connecting pin or a bush at the time of engagement with a driving sprocket as in chains using rollers and bushes can be prevented. Additionally since the occurrence of engagement vibration between the bush and the driving sprocket is prevented, an occurrence of a deviation of engagement timing between the respective chains can be avoided. Thus stable movements forward and backward can be realized without giving vibration due to the deviation of such engagement timing to works, and at the same time torque of the driving sprocket can be efficiently transmitted to the engagement chains.

Furthermore, although the device described above is described using a floor setting surface as an example, the invention may also be used in a ceiling surface, which is a suspended setting form, so that there is no trouble in hoisting and lowering movements. Similarly, even when the setting surface is a vertical wall surface, which is a cantilever supporting form, there is no trouble in the movements forward and backward corresponding to the hoisting and lowering movements.

Further, when the above-described suspended supporting form and cantilever supporting form are adopted, a hoisting/lowering table used when the floor setting form is adopted is not an indispensable component, but works may be directly or indirectly attached to an end portion of the engagement chains by use of other means.

What is claimed is:

1. An engagement chain type driving device comprising:
    a pair of driving sprockets, which rotate positively and reversely in opposite directions while facing each other about a pair of rotating shafts arranged in parallel with a setting surface;
    a pair of engagement chains, which engage with each other by said pair of driving sprockets so to be integrated together and disengaged from each other; and
    a driving source, which drives said pair of driving sprockets,
    wherein the engagement chain includes inner tooth plates and outer tooth plates, which each include buckling limiting flat surfaces, the inner tooth plates and outer tooth plates being brought opposite to each other and into contact with each other when the engagement chains are integrated by the pair of driving sprockets, such that the flat surfaces hold the chain engagement position,
    wherein the buckling limiting flat surfaces are bulgedly formed so as to elastically deform when they are brought into surface contact and interfering with each other,
    wherein the inner tooth plates and outer tooth plates both include a hook-shaped engagement surface comprising a convex element and a curved engagement receiving surface comprising a concave element, the inner tooth plates and outer tooth plates being integrated by said driving sprockets, and
    wherein interference avoiding spaces are formed so as to prevent interference between engaged inner tooth plates and outer tooth plates, the interference avoiding spaces being formed such that when opposing outer tooth plates engage with each other, there is no contact between the convex element of the hook-shaped engagement surface and the concave element of the curved engagement receiving surface.

2. An engagement chain type driving device comprising:

a pair of engagement chains, wherein each segment of the engagement chain in the width direction includes at least two inner tooth plates and at least two outer tooth plates wherein each of the at least two inner tooth plates and at least two outer tooth plates includes a hook-shaped engagement surface comprising a convex element, flat surface, and a curved engagement receiving surface comprising a concave element;

a pair of driving sprockets, which rotate positively and reversely in opposite directions while facing each other about a pair of rotating shafts arranged in parallel with a setting surface so as bring the inner tooth plates and outer tooth plates of the pair of engagement chains opposite to each other so as to integrate the pair of engagement chains by engaging the hook-shaped engagement surface and curved engagement receiving surface of opposing inner tooth plates and outer tooth plates with each other in a concave element and convex element engagement fashion; and a driving source, which drives the pair of driving sprockets, wherein interference avoiding spaces are formed so as to prevent interference between engaged inner tooth plates and outer tooth plates, the interference avoiding spaces being formed such that when opposing outer tooth plates engage with each other, there is no contact between the convex element of the hook-shaped engagement surface and the concave element of the curved engagement receiving surface.

3. The engagement chain type driving device according to claim 2, wherein the inner tooth plates and outer tooth plates each include buckling limiting flat surfaces are bulgedly formed so elastically deform when they are brought into surface contact and interfering with each other.

4. The engagement chain type driving device according to claim 2, wherein the setting surface is a floor surface.

5. The engagement chain type driving device according to claim 2, wherein the setting surface is a vertical wall surface.

* * * * *